(12) United States Patent
Bilotta et al.

(10) Patent No.: US 10,425,133 B2
(45) Date of Patent: *Sep. 24, 2019

(54) EXTENDED RANGE WIRELESS INTER-NETWORKING SYSTEM AND DEVICE

(71) Applicant: Assured Wireless Corporation, San Diego, CA (US)

(72) Inventors: Thomas R. Bilotta, San Diego, CA (US); Edward C. Lin, San Diego, CA (US); Steven A. Morley, San Diego, CA (US); Robert E. LaRose, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/183,071

(22) Filed: Nov. 7, 2018

(65) Prior Publication Data

US 2019/0074872 A1 Mar. 7, 2019

Related U.S. Application Data

(63) Continuation of application No. 15/984,350, filed on May 19, 2018, now Pat. No. 10,187,128.

(Continued)

(51) Int. Cl.

| | |
|---|---|
| *H04B 7/0413* | (2017.01) |
| *H04W 16/14* | (2009.01) |
| *H04W 16/26* | (2009.01) |
| *H04L 5/14* | (2006.01) |
| *H04W 92/02* | (2009.01) |
| *H04W 88/06* | (2009.01) |
| *H04W 84/12* | (2009.01) |

(Continued)

(52) U.S. Cl.
CPC .............. *H04B 7/0413* (2013.01); *H04L 5/14* (2013.01); *H04W 16/14* (2013.01); *H04W 16/26* (2013.01); *H04B 7/0825* (2013.01); *H04W 84/042* (2013.01); *H04W 84/12* (2013.01); *H04W 88/06* (2013.01); *H04W 92/02* (2013.01)

(58) Field of Classification Search
CPC ............. Y02D 70/142; Y02D 70/1262; Y02D 70/1242; Y02D 70/00; Y02D 70/1264; Y02D 70/1222; H04W 84/12; H04W 88/02; H04W 8/26; H04W 84/042; H04W 4/021; H04W 4/022; H04W 88/10; H04W 28/18; H04W 72/1215; H04W 16/14; H04W 16/16; H04W 92/02; H04W 88/06; H04M 2250/06; H04B 7/0413; H04B 7/0825; H04L 5/14

See application file for complete search history.

(56) References Cited

U.S. PATENT DOCUMENTS

| | | | |
|---|---|---|---|
| 2009/0237321 A1* | 9/2009 | Lin | H01Q 1/246 343/893 |
| 2014/0211771 A1* | 7/2014 | Kim | H04W 84/12 370/338 |
| 2018/0337711 A1* | 11/2018 | Bilotta | H04B 7/0413 |

* cited by examiner

*Primary Examiner* — Rahel Guarino
(74) *Attorney, Agent, or Firm* — Enrique A. Monteagudo

(57) ABSTRACT

Aspects of the present disclosure generally pertains a system and method for wireless inter-networking between a wireless wide area network (WWAN) and a local area network (WLAN) employing one or more extended range wireless inter-networking devices. Aspects of the present disclosure more specifically are directed toward a high powered wireless interconnect device that includes high efficiency circuitry to make it possible to implement in a portable or in-vehicle form factor, which may provide reasonable battery life, size, weight, and thermal dissipation.

21 Claims, 7 Drawing Sheets

Related U.S. Application Data

(60) Provisional application No. 62/508,906, filed on May 19, 2017.

(51) Int. Cl.
*H04W 84/04* (2009.01)
*H04B 7/08* (2006.01)

EXTENDED RANGE WIRELESS INTER-NETWORKING SYSTEM AND DEVICE

CROSS-REFERENCE TO RELATED APPLICATIONS

This application claims priority to currently pending U.S. non-provisional patent application Ser. No. 15/984,350, filed May 19, 2018 entitled Extended Range Wireless Inter-Networking System and Device, which claims priority to U.S. provisional patent application 62/508,906 filed May 19, 2017 entitled Extended Range Wireless Internetworking System and Device. The contents of both are incorporated herein by reference in their entirety.

BACKGROUND OF THE INVENTION

Technical Field

The present disclosure generally pertains to wireless communication devices, and is more particularly directed towards wireless inter-networking.

Related Art

A wireless wide area network (WWAN) and a wireless local area network (WLAN) are different forms of wireless networks, which generally utilize different standardized technologies. For example, a WWAN may utilize mobile telecommunication cellular network technologies, while a WLAN may utilize Wi-Fi for communications and to transfer data. A WWAN extends over a large geographical distance and typically requires fixed infrastructure such as networked cellular base stations configured to communicate to mobile handheld devices. A WLAN provides coverage within a limited area and typically uses stationary and mobile devices configured to communicate to other stationary and mobile devices. Mobile devices are typically limited by battery life, transmission power, and range, however.

Many metropolitan areas have extensive infrastructure built out to provide seamless connectivity as the mobile handheld devices travel from cell to cell of the WWAN. However, users may experience disruptions in areas that are remote, underdeveloped, have walls or other obstructions that block radio signals, and/or where infrastructures are inoperable, such as during emergencies. This can be particularly challenging for public safety first responders who regularly operate in unpredictable environments, but who nonetheless need reliable, mission-critical wireless communications for optimal performance.

In WWAN telecommunications, Long-Term Evolution (LTE) is one standard for high-speed wireless communication for mobile phones and data terminals, based on the GSM/EDGE and UMTS/HSPA technologies. The LTE standard covers a range of many different bands, each of which is designated by both a frequency and a band number. For example, Band 14 is the spectrum licensed to the First Responder Network Authority (FirstNet) to create a nationwide public-safety wireless broadband network. Band 14 represents 20 MHz of spectrum in the 700 MHz band that provides good propagation in urban and rural areas and decent penetration into buildings. However, existing standard-power broadband devices fall short in their ability to connect at long range or deeply inside large concrete buildings.

U.S. Pat. No. 7,382,771 to Leblanc, et al. on Jun. 3, 2008, shows a mobile wireless hotspot system. The disclosed system relates to wireless Internet access points, and in particular to providing a mobile wireless access point for use with high-speed wireless devices. In particular, the system allows client devices configured for short-range, high-speed wireless Internet access to use said system to access the Internet while in a mobile environment, such as a passenger vehicle.

The present disclosure is directed toward overcoming known problems and problems discovered by the inventors.

SUMMARY OF THE INVENTION

Aspects of the present disclosure generally pertains a system and method for wireless inter-networking between a wireless wide area network (WWAN) and a local area network (WLAN) employing one or more extended range wireless inter-networking devices. Aspects of the present disclosure more specifically are directed toward a high powered wireless interconnect device that may include high efficiency circuitry to make it possible to implement in a portable or in-vehicle form factor, which may provide reasonable battery life, size, weight, and thermal dissipation.

A wireless wide area network (WWAN) radio is disclosed herein. The WWAN radio includes a WWAN transceiver/MODEM configured to communicate over one or more WWANs, a standard power port communicably coupled to the first WWAN transceiver/MODEM, and configured as a standard duplex chain including a standard power port antenna, the standard power port configured to transmit at a first maximum power level and a high power port communicably coupled to the first WWAN transceiver/MODEM, and configured as a high power duplex chain including a high power amplifier, a frequency duplexer, and a high power antenna, the high power configured to transmit at a second maximum power level, said second maximum power level being greater than said first maximum power level.

According to one embodiment, a high power user equipment (HPUE) for wireless inter-networking is disclosed herein. The HPUE includes a support structure, a power supply coupled to the support structure, a processor mounted to the support structure and powered by the power supply, a memory communicably coupled to and operable by the processor, a wireless local area network (WLAN) radio communicably coupled to and operable by the processor, and a wireless wide area network (WWAN) radio communicably coupled to and operable by the processor. The WLAN radio includes a WLAN transceiver/MODEM communicably coupled to a WLAN antenna. The WWAN radio includes a WWAN transceiver/MODEM configured to communicate over one or more WWANs, a standard power port communicably coupled to the WWAN transceiver/MODEM, and configured as a standard duplex chain including a standard power port antenna, the standard power port configured to transmit at a first maximum power level, and a high power port communicably coupled to the WWAN transceiver/MODEM, and configured as a high power duplex chain including a high power amplifier, a frequency duplexer, and a high power antenna, the high power configured to transmit at a second maximum power level, said second maximum power level being greater than said first maximum power level.

According to another embodiment, a high power user equipment (HPUE) for wireless inter-networking is disclosed herein. The HPUE includes a support structure, a power supply coupled to the support structure, a processor mounted to the support structure and powered by the power supply, a memory communicably coupled to and operable the processor, a wireless local area network (WLAN) radio communicably coupled to and operable by the processor, the WLAN radio including a WLAN transceiver/MODEM communicably coupled to a WLAN antenna, and a wireless wide area network (WWAN) radio communicably coupled to and operable by the processor. The WWAN radio includes a first WWAN transceiver/MODEM configured to communicate over one or more WWANs, a standard power port communicably coupled to the first WWAN transceiver/MODEM, and configured as a standard duplex chain including a standard power port antenna, the standard power port configured to transmit at a first maximum power level, a second WWAN transceiver/MODEM configured to communicate over one or more WWANs, and a high power port communicably coupled to the first WWAN transceiver/MODEM, and configured as a duplex chain including a high power amplifier, a frequency duplexer, and a high power antenna, the high power configured to transmit at a second maximum power level, said second maximum power level being greater than said first maximum power level.

According to yet another embodiment, an inter-networking system is disclosed herein. The inter-networking system includes a wireless local area network (WLAN) configured to communicate with at least one mobile communication device according to a WLAN communication protocol, a first wireless wide area network (WWAN) configured to communicate with at least one base station according to a first WWAN communication protocol, and a high power user equipment (HPUE) configured to wirelessly communicate with the WLAN and the first WWAN, and further configured to communicably couple at least one mobile communication device with the first WWAN via the WLAN. The HPUE includes a housing, a power supply coupled to the housing, a processor mounted to the housing and powered by the power supply, a memory communicably coupled to and operable the processor, a WLAN radio communicably coupled to and operable by the processor, the WLAN radio including a WLAN transceiver/MODEM communicably coupled to a WLAN antenna, and a WWAN radio communicably coupled to and operable by the processor. The WWAN radio includes a WWAN transceiver/MODEM configured to communicate over one or more WWANs, a standard power port communicably coupled to the WWAN transceiver/MODEM, and configured as a standard duplex chain including a standard power port antenna, the standard power port configured to transmit at a first maximum power level, and a high power port communicably coupled to the WWAN transceiver/MODEM, and configured as a high power duplex chain including a high power amplifier, a frequency duplexer, and a high power antenna, the high power configured to transmit at a second maximum power level, said second maximum power level being greater than said first maximum power level.

DETAILED DESCRIPTION

Figure 1:
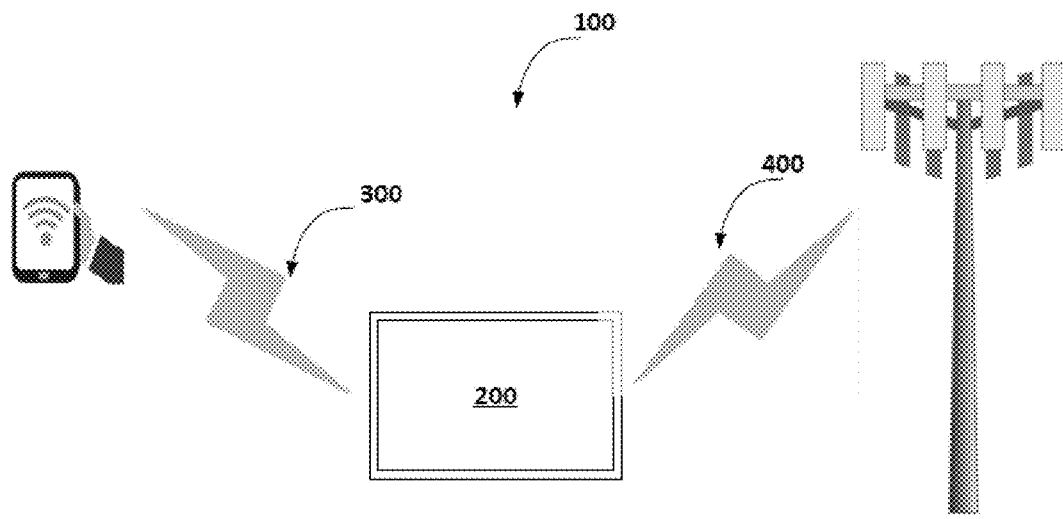
FIG. 1 schematically illustrates an extended range wireless inter-networking system, according to one embodiment of the disclosure.

Aspects of the present disclosure relate to a system and method for wireless inter-networking between a wireless wide area network (WWAN) and a local area network (WLAN) employing one or more extended range wireless inter-networking devices. Aspects of the present disclosure also apply to other connected inter-networking devices such as smartphones, and other data devices in general. Embodiments of the system and method are directed toward a high powered wireless interconnect device that may include high efficiency circuitry (e.g., utilizing 25% and above efficient amplifiers) to make it possible to implement in a personal, portable, and/or in-vehicle form factor, which may provide reasonable battery life, size, weight, and thermal dissipation. For instance, a traditional amplifier is in the 10-15% efficient range. However, to illustrate, an "out-of-spec" or high power transmission, as described below may result in excessive power consumption and heat generation. To illustrate, a six times increase in battery power may be required to support just a doubling of power transmitted, as needed for the high power/extended range communications. As it stands, under normal (standard, in-range) WWAN operations, personal mobile devices can become uncomfortably hot and battery life unduly short, particularly with user equipment already having many use cycles Briefly described and generally, the disclosure includes an inter-networking device and system where a WWAN modem is integrated with an efficient radio frequency (RF) front-end (RFFE) having the appropriate capability to meet stringent wireless requirements in a fashion that increases network performance without degradation to the performance of either the wireless network system, neighboring wireless equipment, and its own receive performance (include drawing of antenna and filtering of RFFE to avoid desense and enable high power). The higher performance modem is integrated seamlessly at the RF section and the appropriate protocol level to ensure network control performance is seamless and avoids improper interactions within the system at all protocol layers. It may also include other WWAN operational bands (e.g., multi-band) that may or may not be of higher power and integrate seamlessly, whether under local control or through a handoff process under network control. Included within this disclosure are antenna configurations beneficial for performance without creating self-interference.

Various aspects of the novel systems, devices, and methods are described more fully hereinafter with reference to the accompanying drawings. The detailed description set forth herein, in connection with the appended drawings, is intended as a description of various configurations and embodiments, and is not intended to represent the only configurations in which the concepts described herein may be practiced. The detailed description includes specific details for the purpose of providing a thorough understanding of various concepts. In particular, it will be apparent to those skilled in the art that these concepts may be practiced without these specific details. In some instances, well known structures and components are shown in block diagram form in order to avoid obscuring such concepts.

FIG. 1 schematically illustrates an extended range wireless or high power inter-networking system ("inter-networking system"), according to one embodiment of the disclosure. Here, an inter-networking system 100 is shown according to one exemplary embodiment. As shown, the inter-networking system 100 may include a device for wireless inter-networking, or high power user equipment ("HPUE") 200, a WLAN 300, and a WWAN 400. The HPUE 200 may be configured to communicably couple with WLAN 300 and WWAN 400 simultaneously.

The WLAN 300 is broadly understood to include a wireless computer network that links two or more devices using a wireless distribution method (often spread-spectrum or OFDM radio) within a limited area such as a building, home, school, or field, to name a few. The WLAN 300 may be configured to provide a connection to a private intranet and/or the wider Internet. According to one embodiment, WLAN 300 may be based on IEEE 802.11 standards (e.g., Wi-Fi).

The WWAN 400 is broadly understood to include a wireless network covering a larger or wider area in size than the WLAN 300. Further, WWAN 400 may differ from WLAN 300 by using mobile telecommunication cellular network technologies such as LTE, WiMAX, UMTS, CDMA2000, GSM, cellular digital packet data and Mobitex to transfer data. It can also use Local Multipoint Distribution Service (LMDS) or Wi-Fi to provide Internet access. Further, it may connect to/from anywhere within the regional boundaries of such service. Various computers can have integrated WWAN capabilities. According to one embodiment, the WWAN 400 may also be any closed network that covers a large geographic area (e.g., a mesh network or mobile ad hoc network (MANET) with nodes on building, tower, trucks, and planes).

Figure 2:
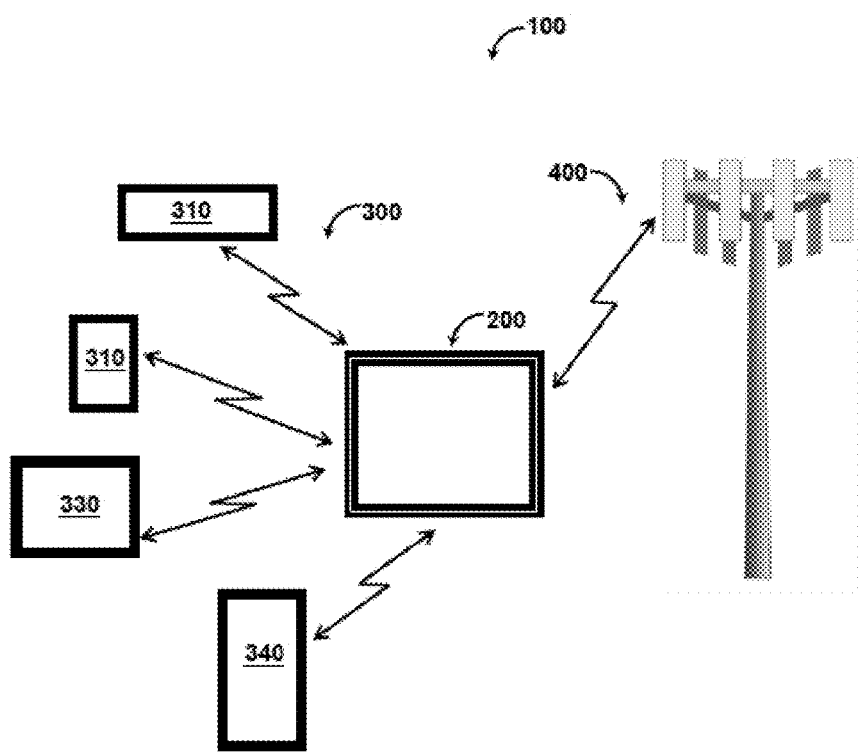
FIG. 2 schematically illustrates the extended range wireless inter-networking system of FIG. 1.

FIG. 2 schematically illustrates the extended range wireless inter-networking system of FIG. 1. Here, the inter-networking system 100 is shown with additional exemplary infrastructure. In particular and as shown, the HPUE 200 may be configured to communicate voice, text, streamed content, and/or packet data over the WLAN 300 with at least one of a computer (e.g., laptop) 310, a mobile communication device (e.g., smart phone) 320, a handheld computer (e.g., tablet) 330, and a networking device (e.g., wireless router, Bluetooth sensor nodes, etc.) 340. It is understood that other WLAN-enabled devices are contemplated. Likewise, the HPUE 200 may be further configured to communicate voice, text, streamed content, and/or packet data over the WWAN 400 via a base station 410.

According to one preferred embodiment, the WLAN 300 may operate over the IEEE 802.11 standards. According to another preferred embodiment, the WWAN 400 may operate over Band 14 of the LTE standard. According to yet another preferred embodiment, the HPUE 200 may be configured to emit a Class 1 high power transmission over the WWAN 400, where the transmit power exceeds that used by standard cellular devices, for example, by a factor of 6 (e.g., 8 dB), which is the maximum permitted by the standards and regulatory bodies.

It should be noted that current communication chipsets may experience premature wear, damage, and even failure upon reception of its own transmissions at these elevated, high power levels. As such and as described below, the HPUE 200 may incorporate the efficient RFFE having appropriate (i.e., for the particular application) extra protection so as to not blow out commercial receiver, for example, during extended range, high power transmissions. However, to increase network performance without degradation to the performance of either the wireless network system, neighboring wireless equipment, and its own receive performance, added impedance (e.g., addition of a 13 dB pad) is limited or balanced to not render base station transmissions overly attenuated while recognizing power coming back while in the high power mode of operation. For example, the HPUE 200 may be configured to maintain a balanced link budget (or imbalanced) through its operational range. The link budget referred to herein is the difference in power loss allowed for the downlink transmission versus the uplink transmission. Also as discussed below, the HPUE 200 may incorporate a rejection filter (discussed below) in its WWAN radio that is be specifically tuned to that of the power transmitted (including non-linear harmonics and VSWR issues in transmit chain). According to yet another preferred embodiment, the WLAN 300 and/or the WWAN 400 may separately or jointly incorporate encryption and authentication features.

According to one preferred embodiment, the WLAN 300 may be configured to operate in an infrastructure and/or ad hoc mode. In ad hoc mode, mobile units may transmit directly peer-to-peer. In infrastructure mode, mobile units may communicate through an access point that serves as a bridge to other networks (such as Internet or LAN). For example, according to a preferred embodiment, the HPUE 200 may be configured to communicably couple with WLAN 300 and WWAN 400 simultaneously, and operate as a "hotspot" between the WWAN 400 and end user devices 310, 320, 330, 340 over the WLAN 300. The WLAN 300 may be configured as a virtual private network (VPN) and/or may include other security features.

Figure 3:
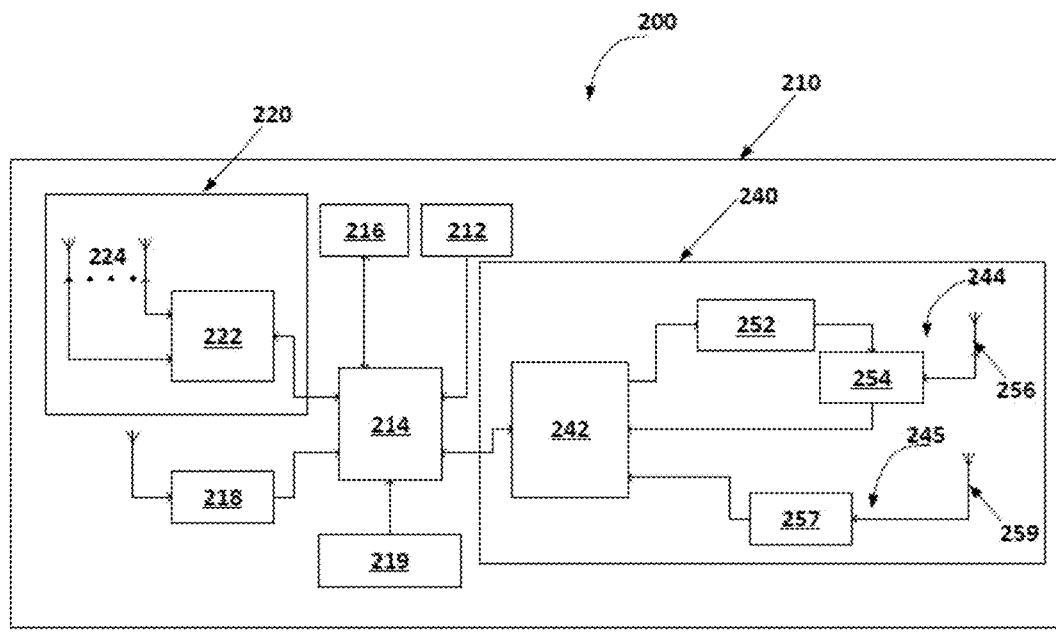
FIG. 3 schematically illustrates an extended range wireless inter-networking device, according to one embodiment of the disclosure.

FIG. 3 schematically illustrates an extended range wireless inter-networking device, according to one embodiment of the disclosure. Here, the HPUE 200 is shown according to one exemplary embodiment. As shown, the HPUE 200 may include a support structure or chassis (e.g., a substrate, PCB, housing 210, etc.), and affixed or otherwise coupled to the support structure (hereinafter housing 210) the HPUE 200 may further include a power supply 212, a processor 214, a memory 216, a WLAN radio 220, and a WWAN radio 240. According to one embodiment, the HPUE 200 may further include a location radio 218 including but not limited to a location radio adapted for a global navigation satellite system (GNSS) such as United States' Global Positioning System (GPS), Russia's GLONASS, China's BeiDou Navigation Satellite System (BDS) and the European Union's Galileo, etc. or any other Real-time locating systems (RTLS). According to one embodiment, the HPUE 200 may further include an n-axis accelerometer 219. This may provide the benefit of providing inertial navigation enhancing resolution and reliability of the location radio 218, for example.

Aspects of the disclosure may include a plurality of different housings 210. In particular, by applying the teachings disclosed herein, it may be possible to tailor the HPUE 200 to have a form factor unique to its application. For example, and as discussed further below, the housing 210 may be configured as a handheld device or as an extended battery life device. Also for example, the housing 210 may be configured as a ruggedized case, a waterproof case, and/or a modular/MIL-STD case, and/or include a vehicular mount and/or vehicular interfaces such as to external antennas and to a CAN bus, etc., and any combination thereof. Further, as discussed throughout, it is contemplated that the HPUE 200 may designed to be used in adverse environments, for example by first responders, police, and military.

The power supply 212 may be configured to power at least one of the processor 214, the memory 216, the location radio 218, the n-axis accelerometer 219, the WLAN radio 220, and the WWAN radio 240. The power supply 212 may be embodied as an energy storage (e.g. rechargeable battery), or as part of an external power supply (e.g., AC wall power, DC car adapter, etc.). The processor 214 may be communicably coupled to at least one of the memory 216, the location radio 218, the n-axis accelerometer 219 the WLAN radio 220, and the WWAN radio 240.

The HPUE 200 may be configured to communicably couple with WLAN 300 (FIG. 2) and WWAN 400 (FIG. 2) simultaneously. In particular, the WLAN radio 220, is broadly understood to include any RF equipment configured to communicate over a desired WLAN, such as WLAN 300, for example. Similarly, the WWAN radio 240 is broadly understood to include any RF equipment configured to communicate over a desired WWAN, such as WWAN 400, for example. Further, and as discussed in detail below, the WWAN radio 240 may be configured to communicate over greater ranges and greater attenuation than conventional WWAN radios.

According to one embodiment, the WLAN radio 220 may include a WLAN transceiver/MODEM 222 communicably coupled to a WLAN antenna (e.g., MIMO antenna) 224, together configured to communicate over the WLAN 300. According to one embodiment, WLAN radio 220 may be embodied as or otherwise include a personal area network (PAN) radio.

According to one embodiment, WWAN radio 240 may include a first WWAN transceiver/MODEM, a high power port communicably coupled to the first WWAN transceiver/MODEM, and configured as a duplex chain including a high power amplifier, a frequency duplexer, and a high power antenna, and a diversity port communicably coupled to the first WWAN transceiver/MODEM, and configured as a complementary receive path including a rejection filter and a diversity antenna. As shown, a WWAN transceiver/MODEM 242 may be communicably coupled to a full duplex (transmit and receive) high power port 244 and to a half-duplex (receive) diversity port 245, together configured to communicate over WWAN 400.

The high power port 244 may be configured as a duplex chain including a high power amplifier 252, a high power port frequency duplexer 254, and an antenna (high power port antenna 256). The high power amplifier 252 may be configured to further amplify a transmission from the WWAN transceiver/MODEM 242 upstream of the high power port frequency duplexer 254. The high power amplifier 252 provides a fixed or adjustable gain to the uplink transmit signal such that the energy radiated from the antenna port 256 is sufficient to have an extended range. To illustrate, standard mode WWAN communications are limited in their transmission power, where the current maximum levels allowed are in 100's of milliwatts range (e.g., 0.300 watts). In contrast, the permissible amount of transmit power currently permitted by the standards for Band 14 is 1.25 watts to the antenna 256. However, one drawback associated with high power transmissions is the issue is that higher powers create significant issues with battery consumption (due to low efficiency amplifiers traditionally used), out of band issues due to non-linear amplification, and also with raised power levels. Further, traditionally, the receive chain would be designed to not expect that much extra power coupling in, so the diversity chain becomes less sensitive. According to one embodiment, high power amplifier 252 of the high power port 244 may be configured to transmit greater than 0.3 watts, 0.5 watts, 1.0 watts, and/or 1.25 watts to the high power antenna 256. Alternately, high power amplifier 252 of the high power port 244 may be configured to transmit to the high power antenna 256 in a range of 0.3 watts to 2.0 watts, 0.5 watts to 1.25 watts, of 0.5 watts to 1.0 watts, for example.

The diversity port 245 may be configured as a complementary receive path including a rejection filter 257 and a diversity antenna 259. The rejection filter 257 provides protection to the conventional implementations of the WWAN transceiver/MODEM 242 by reducing the energy level seen by the diversity port 245 from the transmitted signals out of the high power port antenna 256 sufficiently such that these higher transmitted powers avoid temporary or permanent performance degradation of the WWAN transceiver/MODEM 242.

In operation, the separate high power transmit and receive paths between the WWAN transceiver/MODEM 242 and the high power antenna 256 may be duplexed via the high power port frequency duplexer 254. Further, transmissions to the high power antenna 256 from the WWAN transceiver/MODEM 242 may be amplified via the high power amplifier 252, extending the transmission range. Also, receptions from the high power antenna 256 may be communicated directly to the WWAN transceiver/MODEM 242 on an isolated receive path. More particularly, for example, the frequency duplexer 242 may be functionally coupled to and between the high power amplifier 252 and the high power antenna 256, and is further functionally coupled to the receive port 237 (FIG. 4) of the WWAN transceiver/MODEM 242, the frequency duplexer 242 may be configured to isolate the receive port 237 of the WWAN transceiver/MODEM 242 from transmissions of the high power amplifier 252. Advantageously, the inter-networking device (HPUE 200) may extend network connectivity over the WWAN 400 by having a high power transmit chain that more closely balances the communications link. Conventional transceivers require additional external functionality to meet full performance requirements that are possible in a wireless network.

Here, the radio frequency (RF) front end (RFFE) (high power port 244 and diversity port 245) provides a method to integrate high power capability into the inter-networking device while maintaining transmit and receive performance levels. Advantageously, the RFFE uses techniques illustrated here and discussed further below permit conventional RF transceiver devices and technologies to be used. However, as illustrated, adding the high-power amplifier 252 in the chain may obligate the use of a more stringent duplexer and receive filtering when compared to architectures found in most frequency division duplexing devices. In general, the efficient RFFE should be understood to be able to support any and all WWAN radio constellations, able to support all WWAN power levels, able to pass without external circuitry all regulatory requirements, able to versatile in support for enhanced operations such as MIMO, diversity, able to be frequency nimble, versatile and independent, able to sustain MDS through all transmit power levels, reduction of AGC and AFC scintillation that causes issues in the demod, etc.

According to one embodiment, and as discussed above, the rejection filter 257 of the WWAN radio 240 may be configured to maintain a preferred link budget (i.e., preferring the HPUE 200) through an operational range of the high power amplifier 252. For example, the WWAN radio 240 of the HPUE 200 may utilize a rejection filter 257 configured to maintain a preferred link budget of approximately 4 decibel (dB) or less.

Furthermore, the high power port frequency duplexer 254 can be selected or otherwise be configured to handle the higher power output from the amplifier chain and reject the transmit power energy sufficiently on the receive chain of the high power port frequency duplexer 254 such that the WWAN transceiver/MODEM 242 will be able to meet performance requirements and avoid damage or signal degradation. For example, modern-day integrated transceiver devices are extremely sensitive, and expect to receive signal levels below the microwatt range. Transceiver input signal levels in the 10's of microwatts can cause performance degradation, and levels in the milliwatt range can cause permanent damage to the transceiver. Conventional frequency duplexers used in most cellphones reduce the transmit energy to the transceiver by less than a factor of one million. In addition to the fact these duplexers cannot handle the power levels on the transmit input, this energy reduction into the transceiver will degrade the receiver performance. When using high power, the energy reduction must be much greater than this and may be on the order of a factor of 10 millionth or more. The high power port frequency duplexer 254 also may restrict other out-of-band emissions to include harmonics and noise that may interfere with external or internal functions. The bandstop filter reduces the transmit energy in the receive chain such that 7 integrated circuit transceiver solutions can be used without causing damage to the device.

Figure 4:
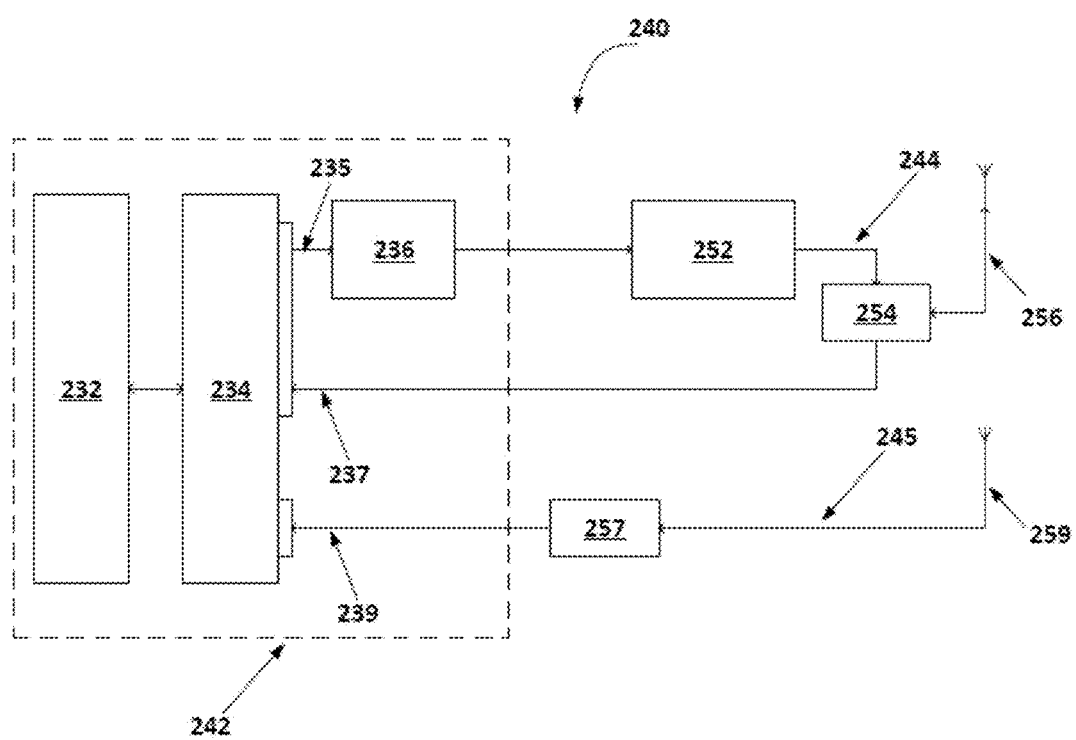
FIG. 4 schematically illustrates a detail section of the extended range wireless inter-networking device of FIG. 3, according to one embodiment of the disclosure.

FIG. 4 schematically illustrates a detail section of the extended range wireless inter-networking device of FIG. 3, according to one embodiment of the disclosure. As above, the WWAN radio 240 may include the WWAN transceiver/MODEM 242 the high power port 244 and the diversity port 245.

According to one embodiment, the WWAN transceiver/MODEM 242 may include a WWAN MODEM, a WWAN transceiver, and a multi-mode power amplifier, the WWAN MODEM functionally coupled to the WWAN transceiver, the WWAN transceiver including a transmit port, a receive port, and a diversity receive port, the transmit port functionally coupled to the multi-mode power amplifier, said multi-mode power amplifier functionally coupled to the high power amplifier, the receive port functionally coupled to the frequency duplexer, the diversity receive port functionally coupled to the rejection filter. In particular and as shown, the WWAN transceiver/MODEM 242 may include a WWAN MODEM 232, a WWAN transceiver 234, and a multi-mode power amplifier 236. The WWAN MODEM 232 may be functionally coupled to the WWAN transceiver 234. The WWAN transceiver 234 may have a transmit port 235 and a receive port 237, as well as a diversity receive port 239.

As shown, the transmit port 235 may be functionally coupled to the multi-mode power amplifier 236, which may be functionally coupled to the high power amplifier 252.

Similarly, the receive port 237 may be functionally coupled to the high power port frequency duplexer 254. Similarly, the diversity receive port 239 may be functionally coupled to the rejection filter 257 or the diversity antenna 259.

According to one embodiment, the WWAN transceiver/MODEM 242 may embodied in a single package, including the WWAN MODEM 232, the WWAN transceiver 234, and the multi-mode power amplifier 236, using conventional technology, as discussed above. According to another embodiment, the WWAN MODEM 232, the WWAN transceiver 234, and the multi-mode power amplifier 236 may be embodied as discrete components, and may be further embodied using conventional components.

Beneficially, the WWAN radio 240 as described herein may provide for improved performance. It should be understood that operation of the WWAN radio 240 at high power, may also require significant limiter and rejection filtering, which decreases sensitivity. However, the decrease in sensitivity of the receiver, may diminish reception or ultimately lead to a reduction in the range that the WWAN radio 240 could operate. Thus, as discussed above, if one overly rejects the incoming signal without regard for the amount of amplification the effect, unbalances the link budget and tilts the shortfall to be downlink (rather the previously corrected uplink unbalance.

Here, aspects of the WWAN radio 240, together or in isolation, address these problems. First, the WWAN radio 240 may incorporate the efficient RFFE disclosed herein and be appropriately balanced for performance/capability without degradation and include drawing of antenna and filtering of RFFE to avoid desense and enable the extended range benefits associated with high power transmissions.

Second, as discussed above, rejection filtering if too strong makes the receiver believe the signal is further away than it truly is, and here the WWAN radio 240 may incorporate the rejection filter specifically tuned to that of the power transmitted (including non-linear harmonics and VSWR issues in transmit chain).

Third, as discussed above the WWAN radio 240 may incorporate various embodiments of the WWAN transceiver/MODEM 242. Further, the WWAN radio 240 may include a higher performance modem. For example, the WWAN transceiver/MODEM 242 may be selected or otherwise configured to be able to meet regulatory requirements of multiple bands while transmitting up to 8 dB above standard max RF power levels which results in a doubling of the acceptable performance range before LOS, to provide expanded coverage and range while being power efficient to allow for operation for duration of work shift event, and to operate with WWANs to select best performance trading off power and operational speed with coverage and range needed Beneficially, the WWAN radio 240 as described herein may provide for improved thermal control. As above, high power operation typically results higher heat and power consumption, which typically results in shortened battery life. This may be a problem especially when the HPUE 200 (FIG. 2), for example, acting as a mobile gateway, could be body worn creating a personal area network (PAN). With the First Responders there is a need to provide data and voice coverage into remote locations previously not accessible using traditional WWAN techniques. Merely using a more powerful transmitter in the WWAN radio 240 might provide extended range transmissions, but, as discussed above, this may significantly increase the heat generated by the device. Furthermore, additional heat dissipation techniques are not typically available on body mounted devices, this additional heat may become intolerable to a wearer, and even arrive to the point of degrading the electronics by surpassing operational tolerances of the ICs (e.g., during persistent operations).

Here, aspects of the WWAN radio 240, together or in isolation, address these problems typically associated with power increase scaling. First, the WWAN radio 240 may incorporate efficient power amplifier(s) (e.g., 25% or greater efficiency) that balances a reduced power consumption and waste heat generation with the desired increased performance. Second and as discussed below (FIG. 6), the WWAN radio 240 may incorporate close loop controls (e.g., feedback monitoring/control of amplification and/or output.

These features the WWAN radio 240, together or in isolation, may advantageously minimize the battery life degradation, and also minimize the costly components of a multi-stage power amplifier and secondary amplification at the antenna.

Furthermore, the embodiment goes beyond traditional design implementation to focus on the high power transmissions and anticipated signal reception to provide enhanced filtering for the receive chain to ensure the modem optimizes signal power to correctly balance the link budget saving power, battery life and minimizing heat and protecting circuits.

Figure 5:
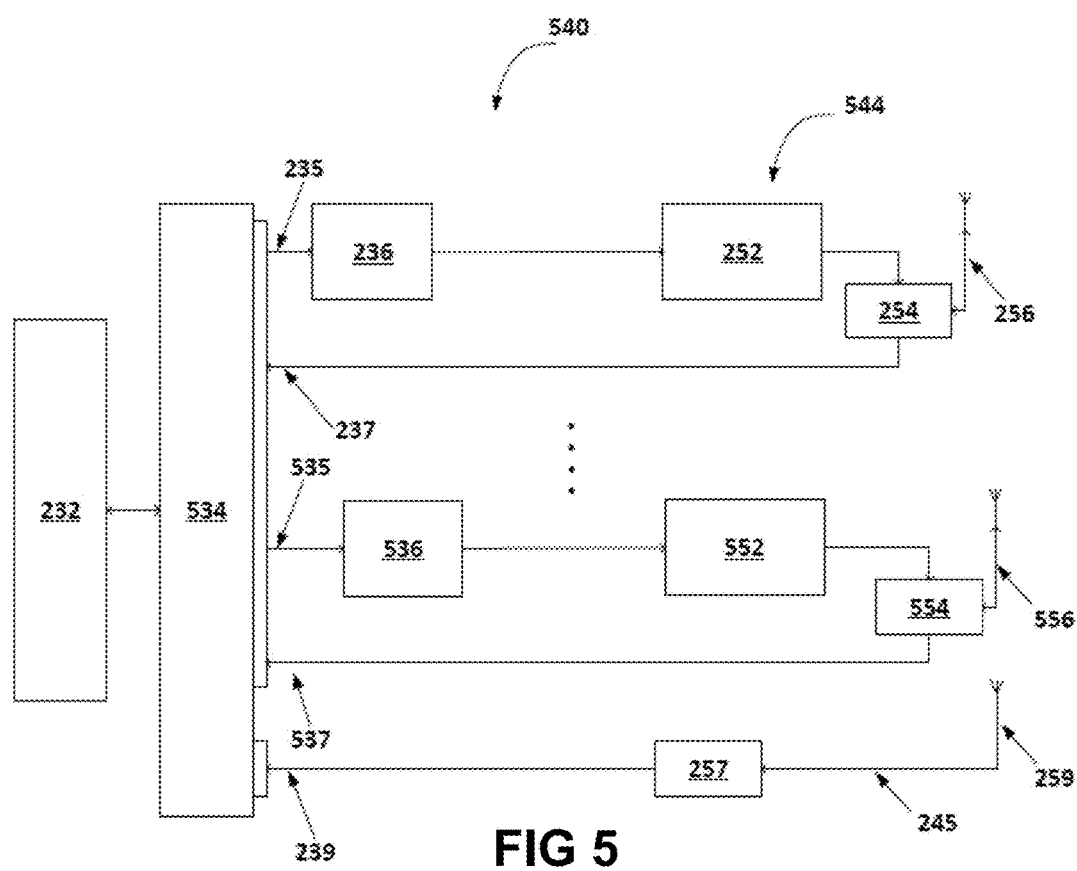
FIG. 5 schematically illustrates a detail section of an extended range wireless inter-networking device, according to another embodiment of the disclosure.

FIG. 5 schematically illustrates a detail section of an extended range wireless inter-networking device, according to another embodiment of the disclosure. In particular, the HPUE may include a MIMO WWAN radio 540. Here, "MIMO" is used for clarity as well to relate to Multiple-Input-Multiple-Output where multiple antennas are used at both the source (transmitter) and the destination (receiver). The antennas at each end of the communications circuit are combined to minimize errors and optimize data speed. MIMO operation may incorporate just one additional duplexed transmit and receive pair or a multiple of duplexed transmit and receive pairs. The diagram assumes all duplexed channels will include a MIMO high power amplifier 552 it does not preclude only using a subset of the MIMO transmit chains in a high power mode. There may be a no diversity receive ports, a single diversity receive port, or a multiple diversity receive ports.

Similar to above, a MIMO WWAN radio 540, shown here, may include the WWAN MODEM 232 communicably coupled to a MIMO WWAN transceiver 534 configured for MIMO communications (e.g., including the transmit port 235, the receive port 237, and the diversity receive port 239, as well as at least one MIMO transmit port 535 and at least one MIMO receive port 537). Also as above, the WWAN modem, WWAN transceiver, and multimode amplifiers may be discrete or packaged together. Further, the MIMO WWAN radio 540 may include the diversity port 245 having the rejection filter 257 and a diversity antenna 259 as discussed above.

According to the illustrated embodiment, the MIMO WWAN radio 540 may also include the multi-mode power amplifier 236 and at least one MIMO multi-mode power amplifier 536, each functionally coupled and configure to amplify its respective duplex chain. It will be appreciated by one skilled in the telecommunications art that the MIMO components may represent 1-to-N duplex chains.

According to the illustrated embodiment, the MIMO WWAN radio 540 may further include a MIMO high power port 544 downstream of the packaged or discrete multimode amplifiers 236, 536, the MIMO high power port 544 being configured to for MIMO communications. In particular, the MIMO high power port 544 may be configured as 2-to-N duplex chains including a first duplex chain including the high power amplifier 252, the high power port frequency duplexer 254, and the high power port antenna 256, and 1-to-N additional duplex chains of, for example, including a MIMO high power amplifier 552, a MIMO frequency duplexer 554 and a MIMO high power port antenna 556. Each duplex chain may be configure as discussed above and integrated into the MIMO architecture of MIMO WWAN radio 540.

Figure 6:
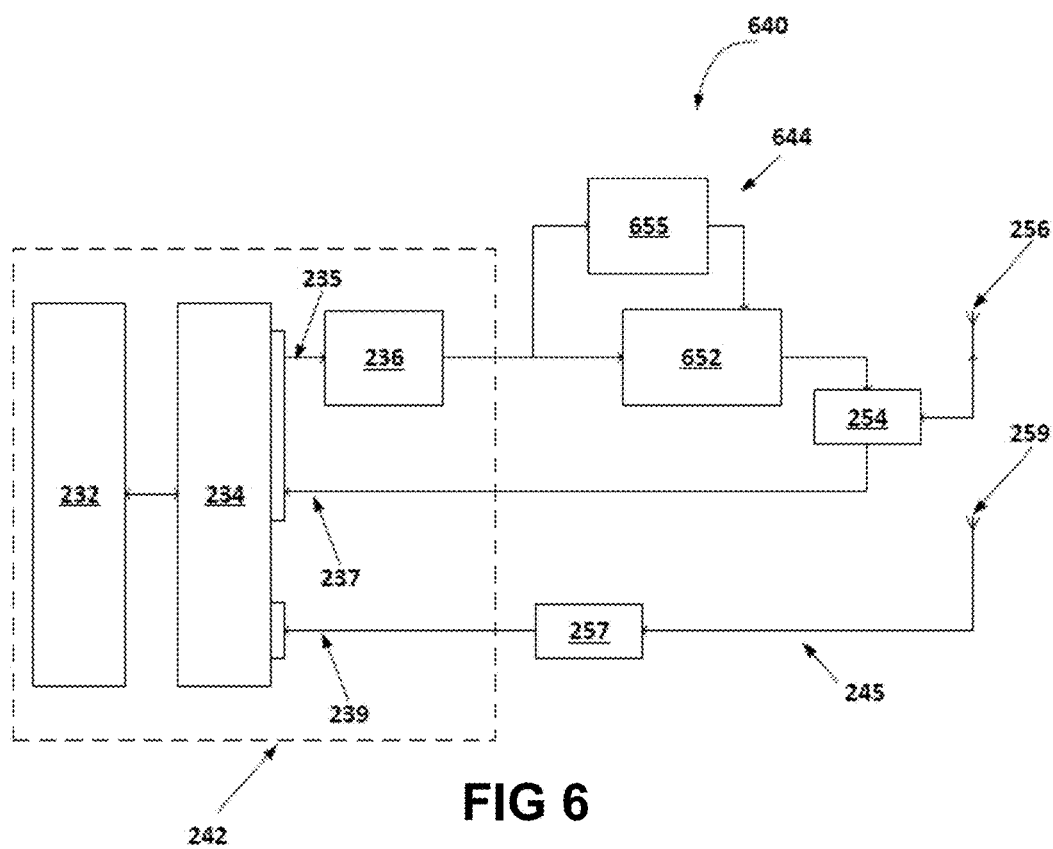
FIG. 6 schematically illustrates a detail section of an extended range wireless inter-networking device, according to another embodiment of the disclosure.

FIG. 6 schematically illustrates a detail section of an extended range wireless inter-networking device, according to another embodiment of the disclosure. In particular, the HPUE may include an efficient WWAN radio 640. Here, "efficient" is used for clarity as well to relate to an amplifier that provides the high output power using a low amount of additional power to provide such an amplification while still maintaining the stringent spectral requirements that the standards and regulatory bodies require. There are various techniques that can be employed to attain such efficiency. Such embodiments may include the use of techniques to decrease the peak power consumption of the signal and applying techniques to track the amplitude of the amplifier such that the minimal amount of power is lost to thermal energy with minimal impact to the transmit performance of the signal.

Similar to above, the efficient WWAN radio 640 may include the WWAN MODEM 232, the WWAN transceiver 234, and the multi-mode power amplifier 236, which may be discrete or packaged. Likewise, efficient WWAN radio 640 may include the diversity port 245 having the rejection filter 257 and a diversity antenna 259.

According to the illustrated embodiment, the efficient WWAN radio 640 may further include an efficient high power port 644 configured to for efficient communications. In particular, the efficient high power port 644 may be configured as a duplex chain including the high power port frequency duplexer 254 and the high power port antenna 256, as discussed above. Further, the efficient high power port 644 may include an efficient high power amplifier 652 and a waveform processor 655. For example, as shown here the efficient high power amplifier 652 includes a feedback loop configured to monitor an output of the efficient high power amplifier (e.g., incorporating the waveform processor 655). Further, the feedback loop is configured to modify the output in response to the feedback loop.

According to one embodiment, the efficient high power amplifier 652 may be a single stage amplifier, or alternately a multistage amplifier. The efficient high power amplifier 652 may be functionally coupled to the multi-mode power amplifier 236, and configured to further amplify transmissions output from the multi-mode power amplifier 236. Also, the waveform processor 655 may be functionally coupled to the multi-mode power amplifier 236 and the efficient high power amplifier 253. Further, waveform processor 655 may be configured to reduce the peak amplitude requirements of the amplifier, track the signal amplitude to permit the high power amplifier 652 to attain a high efficiency ratio, and/or modify the signal such that the amplifier operates at a high efficiency while maintaining the required linearity and spectral requirements mandated by the standards and regulatory bodies. The waveform process may do this analyzing the signal and dynamically modifying it to meet the efficiency and spectral requirements. Another embodiment may also integrate the amplifier output fed back to the waveform processor to make the analysis and adjustments of the signal.

Figure 7:
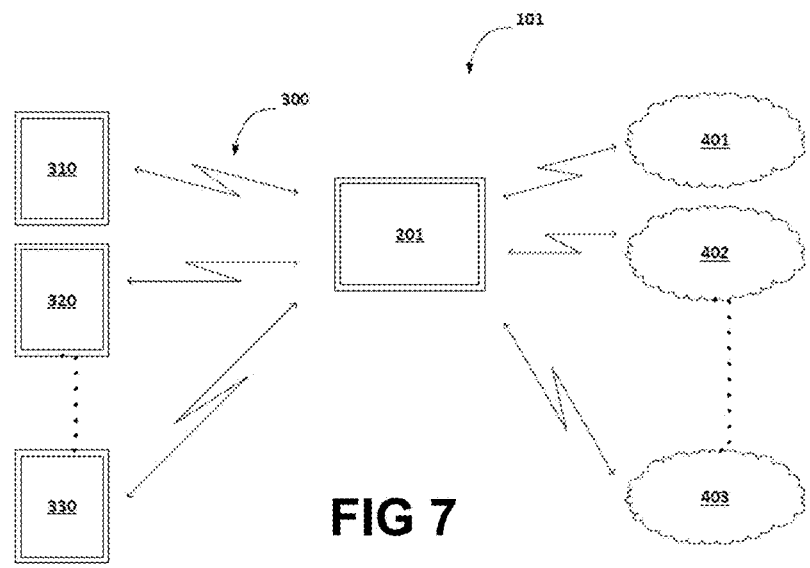
FIG. 7 schematically illustrates an extended range wireless inter-networking system, according to another embodiment of the disclosure.

FIG. 7 schematically illustrates an extended range wireless inter-networking system, according to another embodiment of the disclosure. Here, an inter-networking system 101 is shown according to one exemplary embodiment, and including a HPUE 201 configured to communicate with multiple channels, multiple networks, and/or across diverse technologies.

To illustrate, similar to above, the HPUE 201 may be configured to communicably couple with multiple end user devices 310, 320, 330 via the WLAN 300. Further, the HPUE 201 may be configured to communicably couple with a plurality of WWANs (e.g., WWAN1 401, WWAN2 402, and WWAN3 403) simultaneously, and simultaneously with the multiple end user devices 310, 320, 330. Thus, inter-networking system 101 may include at least a two WWANs (e.g., WWAN1 401 and WWAN2 402) with the HPUE 201 being configured to communicate at least one base station of each, and according to a two separate WWAN communication protocols (e.g., a cellular network standard/protocol and public safety band standard/protocol).

Similarly, and according to one embodiment, the HPUE 201 may be further configured to communicably couple with the multiple end user devices 310, 320, 330 via a plurality of WLANs (not shown). As discussed below, WWAN1 401, WWAN2 402, and WWAN3 403 are broadly contemplated, and may each include any one of diverse channels within a network (e.g., Public Safety band and carrier communications band of an end user device), diverse networks (e.g., different carrier networks), and/or diverse WWAN technologies (e.g., LTE, WiMAX, UMTS, CDMA2000, GSM, etc.). According to one embodiment, WWAN1 401 may be a public band (e.g., LTE Public Safety Band 14) and WWAN1 402 may be a carrier communications band of the end user device 310 (e.g., Verizon LTE network).

Figure 8:
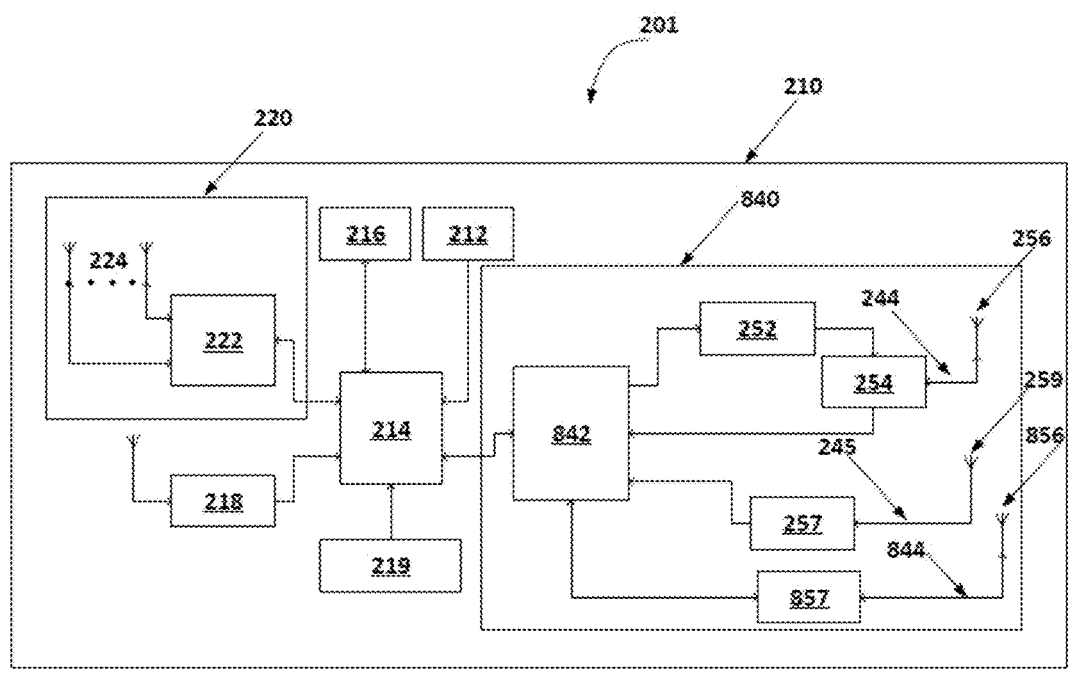
FIG. 8 schematically illustrates an extended range wireless inter-networking device, according to another embodiment of the disclosure.

FIG. 8 schematically illustrates an extended range wireless inter-networking device, according to another embodiment of the disclosure. In particular, an exemplary HPUE 201 is shown including two distinct transmission ports. Here, the HPUE 201 may include the housing 210, the power supply 212, the processor 214, the memory 216, the WLAN radio 220, as discussed above, and may also include a WWAN radio 840 as discussed further below. According to one embodiment, the HPUE 201 may further include the location radio 218 and/or the n-axis accelerometer 219 as discussed above.

The HPUE 201 may be configured to communicably couple with WLAN 300 (FIG. 7) and a plurality of WWANs 401, 402, 403 (FIG. 7) individually and/or simultaneously.

Figure 10:
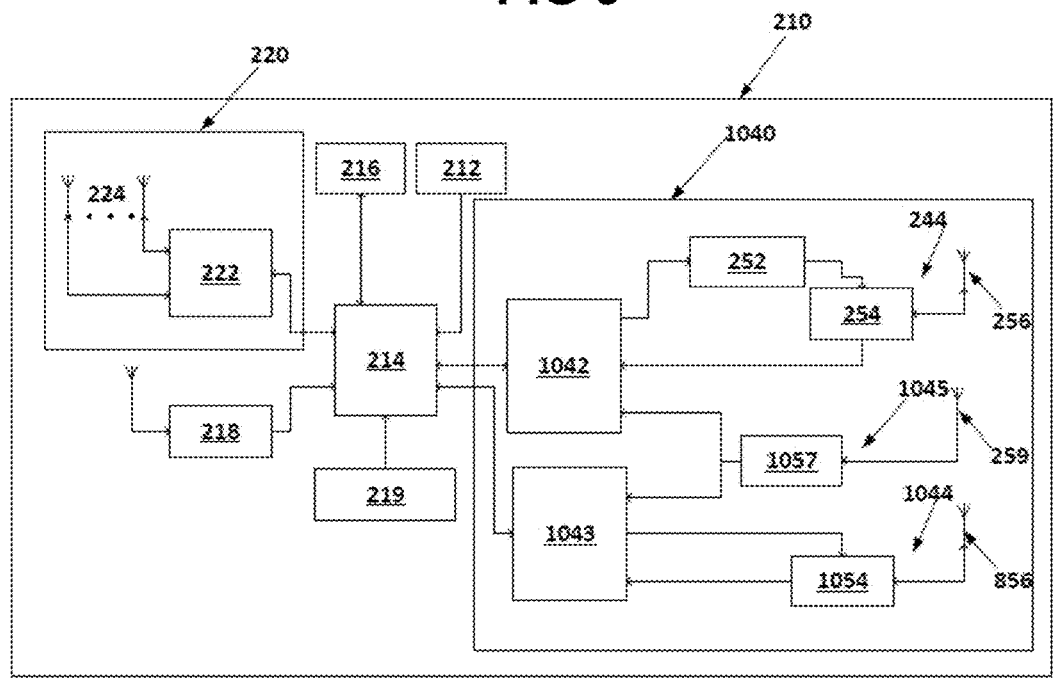
FIG. 10 schematically illustrates an extended range wireless inter-networking device, according to another embodiment of the disclosure.

According to one embodiment, WWAN radio 840 may include a multi-band WWAN transceiver/MODEM 842 communicably coupled to a full duplex (transmit and receive) high power port 244, to a half-duplex (receive) diversity port 245, as discussed above, and to a full duplex (transmit and receive) standard power port 844, together configured to communicate over one or more of WWAN1 401, WWAN2 402, and WWAN3 403. It should be understood that the high power port 244 is conveniently selected for illustration purposes, and may be substituted by the MIMO High Power Port 544 (FIG. 5) or the Efficient High Power Port 644 (FIG. 6), each discussed above. It should be further understood that additional WWAN radios may include a traditional WWAN chipset e.g., additional/second WWAN transceiver/MODEM 1043 (FIG. 10), communicably coupled to, and configured as a standard duplex chain including a standard frequency duplexer 1054 (FIG. 10), and a standard antenna 856 (FIG. 10). Accordingly, communications over the standard power port 844 may approximate those of current WWAN communications, whereas the high power port 244 (and other embodiments) may provide the benefits of communications over greater ranges and greater attenuation than conventional WWAN radios, as well as additional benefits discussed herein. In one embodiment, the traditional WWAN standard power port 844 may include a standard power port rejection filter 857 configured to exclude the high power port energy received on the standard power port antenna 856. For example and as discussed above, the standard power port 844 may be configured to transmit at a first maximum power level (e.g. below 0.3 watts), and the high power port may be adapted and configured to transmit at a second maximum power level, said second maximum power level being greater than said first maximum power level, for example by a factor of greater than six (e.g., >8 dB), or alternately a factor equal to or greater than four.

Figure 9:
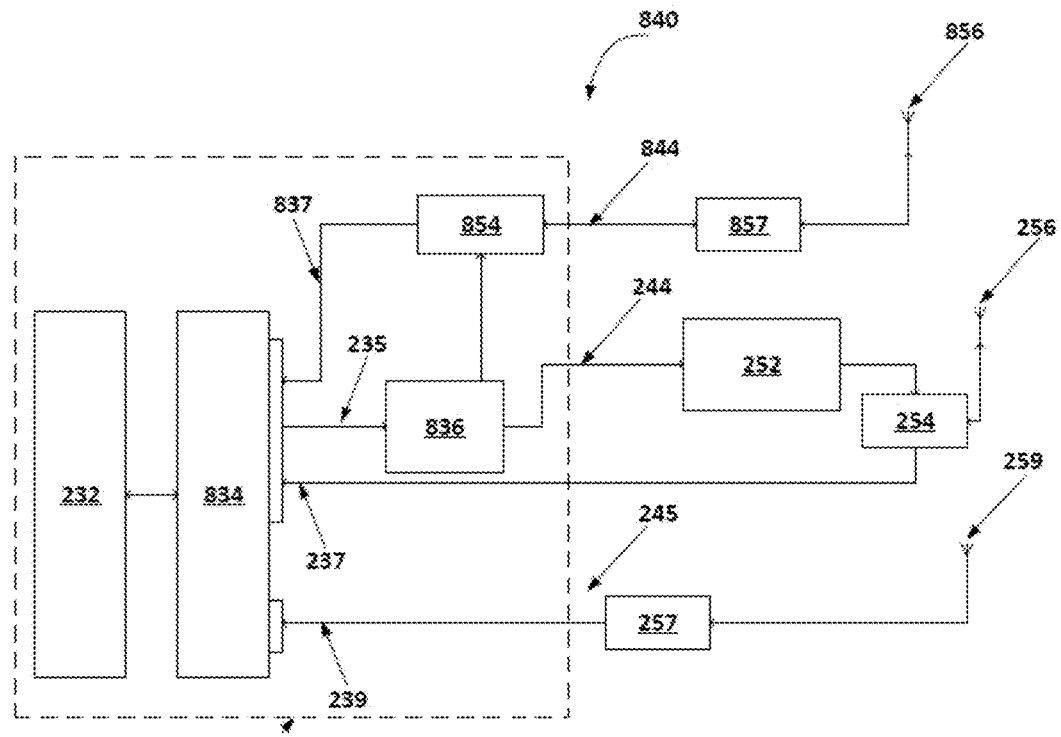
FIG. 9 schematically illustrates a detail section of the extended range wireless inter-networking device of FIG. 7, according to one embodiment of the disclosure.

FIG. 9 schematically illustrates a detail section of the extended range wireless inter-networking device of FIG. 8, according to one embodiment of the disclosure. As above, the WWAN radio 840 may include the WWAN transceiver/MODEM 842, the standard power port 844, the high power port 244, and the diversity port 245, where the standard power port 844 approximates state of the art equipment and the high power port 244 provides enhanced connectivity, with each utilizing the diversity port 245 in reception.

According to one embodiment, the WWAN transceiver/MODEM 842 may include a WWAN MODEM 232, a WWAN transceiver 834, a multi-mode power amplifier 836, and a standard frequency duplexer 854. The WWAN MODEM 232 may be functionally coupled to the WWAN transceiver 834. As above, the WWAN transceiver 834 may have a transmit port 235, a first receive port 237 (part of the high power port 244), and a diversity receive port 239. However, the WWAN transceiver 834 may also have a second receive port 837 as part of the standard power port 844). The two receive ports may be configured internal to the WWAN transceiver 834 where the transceiver has one or more additional ports to support such an input or the signals may be switched just external to the WWAN transceiver 834. An alternate embodiment of the transmit chain from the WWAN transceiver 834 may have two transmit ports where a separate one is routed to the amplifier stages using the transmit port 235 on the high power port and an additional standard power transmit port routed to its own amplifier. Other architectures are contemplated, for example, most cellphone implementations have a multimode amplifier, and the transceiver may use the same transmit port, though some implementations have multiple ports going into the amplifier, and some have multiple amplifiers.

As shown, the multi-mode power amplifier 836 may be functionally coupled to both the standard frequency duplexer 854 (standard transmissions) and the high power amplifier 252 (boosted transmissions). Also, the first receive port 237 may be functionally coupled to the high power port frequency duplexer 254 of the high power port 244, and the second receive port 837 may be functionally coupled to the standard frequency duplexer 854 of the standard power port 844. Further, the diversity receive port 239 may be functionally coupled to the rejection filter 257. In the standard embodiment, the multimode amplifier 836 has two output ports where one is routed to the standard frequency duplexer 854 and the other is routed to the high power amplifier 252. One alternate embodiments may share the multimode amplifier 836 output with a switch to direct the amplified output accordingly. Another embodiment may have transceiver ports and amplifiers.

As above, according to one embodiment, the WWAN transceiver/MODEM 842 may embodied in a single package, including the WWAN MODEM 232, the WWAN transceiver 834, and the multi-mode power amplifier 836. According to another embodiment, the WWAN MODEM 232, the WWAN transceiver 834, and the multi-mode power amplifier 836 may be embodied as discrete components. According to yet another embodiment, the WWAN transceiver/MODEM 842 may be modified from conventional components/chipsets to integrate the high power port 244. In such an embodiment, the WWAN transceiver 834 may have multiple ports to support these multiple paths.

FIG. 10 schematically illustrates an extended range wireless inter-networking device, according to another embodiment of the disclosure.

In particular, an exemplary HPUE 203 is shown including two distinct WWAN transceiver/MODEMs, and for use in an inter-networking system such as inter-networking system 101.

As above, the HPUE 203 may include the housing 210, the power supply 212, the processor 214, the memory 216, the WLAN radio 220, as discussed above, and may also include a WWAN radio 1040 as discussed further below. According to one embodiment, the HPUE 203 may further include the location radio 218 and/or the n-axis accelerometer 219 as discussed above. Also as above, the HPUE 203 may be configured to communicably couple with WLAN 300 (FIG. 7) and a plurality of WWANs 401, 402, 403 (FIG. 7) individually and/or simultaneously.

According to one embodiment, WWAN radio 1040 may include a high power port WWAN transceiver/MODEM as discussed above (here, high power port WWAN transceiver/MODEM 1042) and a standard power port 1044 including an additional WWAN transceiver/MODEM 1043.

As above, the high power port WWAN transceiver/MODEM 1042 may be communicably coupled to the full duplex high power port 244 and to a half-duplex (receive) diversity port 1045 (discussed further below). Similarly, the standard power port WWAN transceiver/MODEM 1043 may be communicably coupled to a full duplex (transmit and receive) standard power port 1044 including a standard frequency duplexer 1054 and the standard power port antenna 856, akin to the RFFE of a conventional mobile wireless communication device.

According to one embodiment, at least one of the high power port 244 and the standard power port 1044 may be configured as a MIMO port such as the MIMO high power port 544 (FIG. 5) discussed above. Also, according to another embodiment, the high power port 244 may be configured as the efficient high power port 644 (FIG. 6). According to yet another embodiment, the standard power port WWAN transceiver/MODEM 1043 and the standard power port 1044 may be embodied as a RFFE of a conventional mobile wireless communication device (e.g., mobile communication device 320 in FIG. 2), while the HPUE 203 is further modified to include a high power port such as the high power port 244, the MIMO high power port 544, and/or the efficient high power port 644. According to yet another embodiment, the diversity antenna 259 in one embodiment may be used or otherwise shared for both the WWAN transceiver/MODEM 1042 and the WWAN transceiver/MODEM 1043 diversity inputs. Another embodiment may utilize two separate antenna and diversity receive paths.

Both WWAN transceiver/MODEMs may operate simultaneously in an independent fashion, separately under user or processor control, or through coordination by a radio control processor which may be processor 214. The output streams from the WWAN radio 1040 may have two separate streams or be combined to have one individual data stream.

INDUSTRIAL APPLICABILITY

The present disclosure generally pertains to a system and method for wireless inter-networking between a wireless wide area network (WWAN) and a local area network (WLAN) and/or personal area network (PAN) employing one or more extended range wireless inter-networking devices, and is applicable to the use, operation, maintenance, repair, and improvement of wireless communication devices and associated infrastructure. The inter-networking system embodiments described herein may be suited for wireless communications for any number of industrial applications, such as, but not limited to, various aspects of the military, police and first response, and the wireless communication industry in general, to name a few examples. Furthermore, the described embodiments are not limited to use in conjunction with a particular type of WLAN or WWAN technology. There are numerous inter-networking configurations and combinations that are applicable here.

Figure 11:
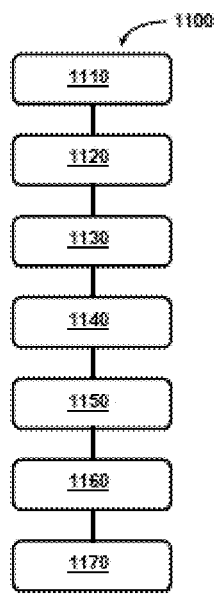
FIG. 11 is a flow chart of an exemplary method for inter-networking a mobile device and a remote base station

For example, it should be understood by one having ordinary skill in the art that, in view of the above discussion, a method 1100 for inter-networking a mobile device and a remote base station. Referring to FIG. 11, showing a flow chart of an exemplary method for inter-networking a mobile device and a remote base station, the method 1100 may include the following steps or variants there of: providing 1110, a wireless local area network (WLAN); providing 1120 a first wireless wide area network (WWAN); providing 1130 a high power user equipment (e.g., HPUE 200 or HPUE 201) configured to wirelessly communicate with the WLAN and the first WWAN, and further configured to communicably couple the mobile device with the first WWAN via the WLAN; communicating 1140 with the mobile device over the WLAN via the WWAN radio; and communicating 1150 with the remote base station in a boosted mode over the WWAN via the high power port of the WWAN radio, the boosted mode including transmissions, for example, greater than 0.5 watts. Further, the method 1100 may include providing 1160 a second WWAN including an in-range base station; and communicating 1170 with the in-range base station in a standard mode over the second WWAN via the high power port of the WWAN radio, the standard mode limiting transmissions to less than 0.5 watts, for example.

While all features and benefits might not be achieved in every embodiment of the disclosure, some benefits may include doubling the range of Public Safety Band 14 wireless broadband equipment and allowing any Wi-Fi-enabled device to connect to the wireless network in even the most remote and difficult environments. Further, a benefit that may not be readily apparent, the disclosed high power user equipment (e.g., HPUE 200 or HPUE 201) may serve as a "base station" for end user devices 310, 320, 330, 340 over the WLAN 300 where a mobile chipsets (e.g., WWAN transceiver/MODEM 242, 1042, 1043) the be effective utilized as a base station Whether it's in the deepest levels of structures or in the most remote outdoor areas, applying the teachings herein, a user may be able to stay connected with all the advanced broadband services currently in use. Further, smartphone, tablet, and IoT devices may continue work in even the most remote and difficult areas, and may achieve mission-critical levels of communications readiness and reliability. In addition, wireless hotspots, routers, smartphones and other similar devices might now stay connected at nearly twice the distance from the base station as well as deep inside underground and concrete structures. Furthermore, the disclosed innovations discovered by the inventors may offer these benefits without significantly increasing the size, power consumption, or thermal dissipation of the user equipment.

While wireless hotspots connect over the wireless wide area network such as a cellular or WiMAX network and have a range and speed limitation caused by having a lower power transmitter found in most commercial handsets, here, the addition of a high power transmitter on the wide area network side, the range for any given data rate can be extended and the network capacity can be expanded by having an adequate signal to noise ratio offered by the higher TX power. Thus the hotspot or HPUE may provide inter-networking between a wireless wide area network (WWAN) and the local or personal area network in a modest form factor that may be generally mobile and portable. Such an inter-networking device that possesses the high power and more reliable front end that maximizes the ability to transmit data to the network station while minimizing the interference to ensure reliable reception increases the range, connection reliability, data rates, and network resiliency. These characteristics are essential for critical communications capabilities. Similarly, existing wireless interconnect devices, such as a variety of hotspot products, provide inter-networking between wireless wide area networks (WWAN), such as cellular-based networks, and local or personal wireless networks (WLAN/WPAN). These existing interconnect devices have range and data rate limitations caused the limited power that they transmit to the WWAN. Higher power transmission from the disclosed HPUE or interconnect devices may extend the range and data rates possible. However, for personal/pedestrian or in-vehicle interconnect devices, the need to operate for long periods of time from a reasonable sized battery constrains the amount of transmission power they can transmit. As a result, the long-range capabilities of the disclosed innovations may make it possible to include a wide range of additional capabilities and use these with reliable connections at long range, for example as an integrated services platform. Some of these additional capabilities may include: Seamless local communications during loss of WWAN backhaul; Network services such as DHCP, DNS, caching; IMS server for voice and video applications; Voice services; Internal support of voice services to WWAN; Attachment over LAN or PAN or direct connect; Group channel change capability for voice, video, or other service groupings; Store-and-forward server for data, voice, and video; Geographic Information System (GIS) server; Computer Aided Dispatch (CAD) server; Audio commands; Audio record and playback and store-and-forward; Security server; Interface to biometrics sensors; Core network services; Includes device management method (e.g., OMA, Motorola device management, SNMP, TR-069); Includes mass storage for database or store-and-forward applications; Includes an application operating system (e.g., Android, Windows, etc.); Multiple-SIM; just to name a few.

Some additional applications and uses may include Enhanced inter-networking devices including: WLAN 802.11, PAN Bluetooth, others, Wired, Data, voice, and video support, Local sensors and control, Works with a plurality of connected devices, Includes GPIO/serial interface for control and monitor functions, Real-time clock with long term battery, With MIMO and diversity, Internal antenna and external antenna connection, Multiple band operation on WWAN and WLAN, Connects to a plurality of WWAN, User interface to set configuration parameters, Adaptive radiation levels and shape depending on SAR environment. Additionally, embedded location capability may include GPS, accelerometer, beacons, triangulation, 802.11, other location technologies, and combinations of any or all of the above Further, additional features may include device security and pairing in order to: Integrate methods of physical verification of identity, RFID, NFC, Fingerprint, Key fob, Entry verification of identity such as UI or voice-based, Identity association with user, Remote monitoring and control of device configuration and operation through wired or wireless connection, Link level security (e.g., SSL, VPN), Physical anti-tamper and tamper detection methods including protection against SIM swapping.

In addition, different form factors are contemplated, such as: Fixed vehicle, wall, or tabletop mounting; Portable wearable, belt, holster mount; Hybrid composed of portable device removable from fixed mounting solution; Vehicle mount with antenna, power, vehicle bus, controls, sensors tied in and removable unit converts to internal antenna control without additional direct wired vehicle connectivity; Vehicle voice input over wired or wireless connection Some embodiments may include Internal alerts for: Remote alert control for user notification; Local control based upon one or more sensor triggers; Integral sensors to detect excessive heat or other environmental effect; External sensors to include body-worn, critical personal support equipment, and operator identity paired with a particular user device; Ability for remote triggering of alert levels; to name a few.

Further aspects of the disclosure may include a device for wireless inter-networking, the device comprising: a means for increasing the RF transmission power of a full-duplex wireless device that transmits and receives on a wireless wide area network (WWAN) with a base station using consumer-level integrated circuits by 1) connecting a RF power amplifier to the transmit signal from the WWAN modem transceiver to boost the total transmitted power, 2) providing a high power, bandwidth-limiting RF combining duplexer function that combines the transmit output signal of the high efficiency RF power amplifier with the received RF signal and connecting the combined RF output of this duplexer to a transmit/receive antenna for transmission to a base station, 3) providing an isolation filtering function to limit feedback of the high power transmit signal to a diversity receiver antenna, if applicable. According to one embodiment, the RF amplifier has a high efficiency. According to one embodiment, the high efficiency RF power amplifier has fixed gain According to one embodiment, the fixed gain high efficiency RF power amplifier has gain set high enough so that the amplifier stage in the modem transceiver is backed off to reduce its noise levels so that the combined out-of-band noise contribution of the staged amplifiers is reduced in order to meet regulatory requirements. According to one embodiment, the RF power amplifier has variable gain that is varied as part of the overall power control methods of the WWAN operation. According to one embodiment, multiple frequency channels may be transmitted, simultaneously or one at a time, from the modem/RF function and in which one or more of these channels is transmitted at higher power while other frequency channel transmissions are made without the additional RF power amplification. In this case, the high power transmission signals may be transmitted on an antenna separate from the antenna used for the non-high power transmission signal. According to one embodiment, the inter-networking device is a wireless cellular handset According to one embodiment, the inter-networking device is a wireless computing device including tablets, computers, etc. According to one embodiment, the inter-networking device is a WWAN connection dongle. According to one embodiment, the inter-networking device is a wireless router. According to one embodiment, the inter-networking device may include a transmission power level measurement method that monitors the RF power at the output of RF power amplifier and provides this measurement information to the wireless modem function for calibration and power control purposes. According to one embodiment, the inter-networking device may include means for filtering the high power RF signals to prevent interference with other RF functions on the device including GPS, Wi-Fi, and Bluetooth signals. According to one embodiment, the inter-networking device may include a filtering function that reduces interference with other RF signals, including the received WWAN signals, is implemented using frequency rejection band stop filter circuits. According to one embodiment, the inter-networking device may include a filtering function that reduces interference with other RF signals, including the received WWAN signals, is implemented using frequency rejection antenna subsystem. According to one embodiment, the inter-networking device may support operation on a WWAN network that requires a subscriber identification module (SIM) According to one embodiment, the inter-networking device may support operation on multiple WWAN networks that requires more than one subscriber identification module (SIM) According to one embodiment, the inter-networking device may be a battery operated portable device, wherein the battery is rechargeable, and/or the battery is replaceable According to one embodiment, the inter-networking device may include means for increasing the RF transmission power from a commercially available modem/transceiver circuit module of a full-duplex portable wireless device that transmits and receives on a wireless wide area network (WWAN) with a base station by 1) connecting a high efficiency RF power amplifier to the transmit signal from the modem/transceiver module to boost the total transmitted power, 2) providing a high power, bandwidth-limiting RF combining duplexer function that combines the transmit output signal of the high efficiency RF power amplifier with the received RF signal and connecting the combined RF output of this duplexer to a transmit/receive antenna for transmission to a base station, 3) providing an isolation filtering function to limit feedback of the high power transmit signal to a diversity receiver antenna, if applicable. According to one embodiment, the inter-networking device may include a WWAN modem integrated on a module having ports for an external transmit, receive, and power monitor function enabling a higher power external amplifier separate from the conventional amplifiers used in cellular user equipment. Further the inter-networking device may include a duplexed or multiple duplexed ports for standard power transmissions output to the antenna subsystem in addition to the high power ports.

The disclosure has been sufficiently described so that a person of ordinary skill in the art can reproduce and obtain the results mentioned in the present disclosure. However, any skilled person in the field of the art of the present disclosure may be able to make modifications not described in the present application. Notwithstanding, if these modifications require a structure or manufacturing process not described in the present disclosure, the modifications should be understood to be within the scope of the claimed

What is claimed is:

1. A wireless wide area network (WWAN) radio comprising:
    a first WWAN transceiver/MODEM configured to communicate over one or more WWANs;
    a standard power port communicably coupled to the first WWAN transceiver/MODEM, and configured as a standard duplex chain including a standard power port antenna, the standard power port configured to transmit at a first maximum power level; and
    a high power port communicably coupled to the first WWAN transceiver/MODEM, and configured as a high power duplex chain including a high power amplifier, a frequency duplexer, and a high power antenna, the high power port configured to transmit at a second maximum power level, said second maximum power level being greater than said first maximum power level.

2. The WWAN radio of claim 1, wherein the first maximum power level is below 0.3 watts, and the second maximum power level is greater than the first maximum power level by a factor equal or greater than four.

3. The WWAN radio of claim 1, wherein the standard power port further includes a standard power port rejection filter configured to reject transmissions of the high power port that are received on the standard power port antenna.

4. The WWAN radio of claim 1, wherein the WWAN transceiver/MODEM includes a WWAN MODEM, a WWAN transceiver, a multi-mode power amplifier, and a standard frequency duplexer, the WWAN MODEM functionally coupled to the WWAN transceiver, the WWAN transceiver including at least one transmit port and at least one receive port;
    wherein the at least one transmit port is communicably coupled to the standard power port via the multi-mode power amplifier, and the at least one receive port is communicably coupled to the standard power port via the standard frequency duplexer; and
    wherein the at least one transmit port is communicably coupled to the high power port via the high power amplifier, and the at least one receive port is communicably coupled to the high power port via the high power port frequency duplexer.

5. The WWAN radio of claim 4, wherein the at least one transmit port and at least one receive port include a first transmit port, a second transmit port, first receive port, and a second receive port;
    wherein the standard power port is communicably coupled to the first transmit port via the multi-mode power amplifier, and to the first receive port via the standard frequency duplexer; and
    wherein the high power port is communicably coupled to the second transmit port via the high power amplifier, and to the second receive port via the high power port frequency duplexer.

6. The WWAN radio of claim 1, wherein the high power amplifier includes a feedback loop configured to monitor an output of the high power amplifier, and is further configured to modify said output in response to said feedback loop.

7. The WWAN radio of claim 1, further comprising a diversity port including a rejection filter and a diversity antenna, the diversity port communicably coupled to the first WWAN transceiver/MODEM, and configured as a complementary receive path for the WWAN radio.

8. A high power user equipment (HPUE) for wireless inter-networking, the HPUE comprising:
    a support structure;
    a power supply coupled to the support structure;
    a processor mounted to the support structure and powered by the power supply;

a memory communicably coupled to and operable by the processor;

a wireless local area network (WLAN) radio communicably coupled to and operable by the processor, the WLAN radio including a WLAN transceiver/MODEM communicably coupled to a WLAN antenna; and a wireless wide area network (WWAN) radio communicably coupled to and operable by the processor, the WWAN radio including a WWAN transceiver/MODEM configured to communicate over one or more WWANs;

a standard power port communicably coupled to the WWAN transceiver/MODEM, and configured as a standard duplex chain including a standard power port antenna, the standard power port configured to transmit at a first maximum power level; and a high power port communicably coupled to the WWAN transceiver/MODEM, and configured as a high power duplex chain including a high power amplifier, a frequency duplexer, and a high power antenna, the high power configured to transmit at a second maximum power level, said second maximum power level being greater than said first maximum power level.

9. The HPUE of claim 8, wherein the first maximum power level is below 0.3 watts, and the second maximum power level is greater than the first maximum power level by a factor equal to or greater than four; and wherein the standard power port further includes a standard power port rejection filter configured to reject transmissions of the high power port that are received on the standard power port antenna.

10. The HPUE of claim 8, wherein the WWAN transceiver/MODEM includes a WWAN MODEM, a WWAN transceiver, a multi-mode power amplifier, and a standard frequency duplexer, the WWAN MODEM functionally coupled to the WWAN transceiver, the WWAN transceiver including at least one transmit port and at least one receive port;

wherein the at least one transmit port is communicably coupled to the standard power port via the multi-mode power amplifier, and the at least one receive port is communicably coupled to the standard power port via the standard frequency duplexer;

wherein the at least one transmit port is communicably coupled to the high power port via the high power amplifier, and the at least one receive port is communicably coupled to the high power port via the high power port frequency duplexer;

wherein the at least one transmit port and at least one receive port include a first transmit port, a second transmit port, first receive port, and a second receive port;

wherein the standard power port is communicably coupled to the first transmit port via the multi-mode power amplifier, and to the first receive port via the standard frequency duplexer; and wherein the high power port is communicably coupled to the second transmit port via the high power amplifier, and to the second receive port via the high power port frequency duplexer.

11. The HPUE of claim 8, further comprising a diversity port including a rejection filter and a diversity antenna, the diversity port communicably coupled to the WWAN transceiver/MODEM, and configured as a complementary receive path for at least one of the standard power port and the high power port.

12. The HPUE of claim 8, wherein the WLAN antenna is a Multiple-Input-Multiple-Output (MIMO) antenna.

13. The HPUE of claim 8, wherein at least one of the high power port and the standard power port is configured as a MIMO port.

14. The HPUE of claim 8, further comprising a location radio; and an n-axis accelerometer configured to provide inertial navigation enhancing resolution and reliability of the location radio.

15. A high power user equipment (HPUE) for wireless inter-networking, the HPUE comprising:

a support structure;

a power supply coupled to the support structure;

a processor mounted to the support structure and powered by the power supply;

a memory communicably coupled to and operable the processor;

a wireless local area network (WLAN) radio communicably coupled to and operable by the processor, the WLAN radio including a WLAN transceiver/MODEM communicably coupled to a WLAN antenna; and a wireless wide area network (WWAN) radio communicably coupled to and operable by the processor, the WWAN radio including a first WWAN transceiver/MODEM configured to communicate over one or more WWANs, a standard power port communicably coupled to the first WWAN transceiver/MODEM, and configured as a standard duplex chain including a standard power port antenna, the standard power port configured to transmit at a first maximum power level, a second WWAN transceiver/MODEM configured to communicate over one or more WWANs, and a high power port communicably coupled to the first WWAN transceiver/MODEM, and configured as a duplex chain including a high power amplifier, a frequency duplexer, and a high power antenna, the high power configured to transmit at a second maximum power level, said second maximum power level being greater than said first maximum power level.

16. The HPUE of claim 15, wherein the WWAN radio is a multi-band WWAN radio configured to communicate over one or more WWANs individually, or alternately, simultaneously.

17. The HPUE of claim 15, further comprising a diversity port including a rejection filter and a diversity antenna, the diversity port communicably coupled to at least one of the first WWAN transceiver/MODEM and the second WWAN transceiver/MODEM, the diversity port configured as a complementary receive path for at least one of the standard power port and the high power port.

18. An inter-networking system comprising:

a wireless local area network (WLAN) configured to communicate with at least one mobile communication device according to a WLAN communication protocol;

a first wireless wide area network (WWAN) configured to communicate with at least one base station according to a first WWAN communication protocol; and a high power user equipment (HPUE) configured to wirelessly communicate with the WLAN and the first WWAN, and further configured to communicably couple at least one mobile communication device with the first WWAN via the WLAN, the HPUE including:

a housing, a power supply coupled to the housing, a processor mounted to the housing and powered by the power supply, a memory communicably coupled to and operable the processor, a WLAN radio communicably coupled to and operable by the processor, the WLAN radio including a WLAN transceiver/MODEM communicably coupled to a WLAN antenna, and a WWAN radio communicably coupled to and operable by the processor, the WWAN radio including a WWAN transceiver/MODEM configured to communicate over one or more WWANs, a standard power port communicably coupled to the WWAN transceiver/MODEM, and configured as a standard duplex chain including a standard power port antenna, the standard power port configured to transmit at a first maximum power level, and a high power port communicably coupled to the WWAN transceiver/MODEM, and configured as a high power duplex chain including a high power amplifier, a frequency duplexer, and a high power antenna, the high power configured to transmit at a second maximum power level, said second maximum power level being greater than said first maximum power level.

19. The inter-networking system of claim 18, further comprising a plurality of electronic devices selected from a group consisting of a computer, a mobile communication device, a handheld computer, a networking device, each configured to communicate with the WLAN radio of the HPUE and a base station via HPUE.

20. The inter-networking system of claim 18, further comprising a second WWAN configured to communicate with another at least one base station according to a second WWAN communication protocol.

21. The inter-networking system of claim 20, wherein the first WWAN communication protocol is a public safety band; and wherein the second WWAN communication protocol is a cellular network.

* * * * *